(12) United States Patent
Petersen et al.

(10) Patent No.: US 11,435,578 B2
(45) Date of Patent: Sep. 6, 2022

(54) METHOD FOR DETECTING A GAZE DIRECTION OF AN EYE

(71) Applicants: Robert Bosch GmbH, Stuttgart (DE); TRUMPF Photonic Components GmbH, Ulm (DE)

(72) Inventors: Andreas Petersen, Stuttgart (DE); Thomas Alexander Schlebusch, Stuttgart (DE); Johannes Meyer, Stuttgart (DE); Hans Spruit, Ulm (DE); Jochen Hellmig, Ulm (DE)

(73) Assignees: TRUMPF PHOTONIC COMPONENTS GMBH, Ulm (DE); ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/335,780

(22) Filed: Jun. 1, 2021

(65) Prior Publication Data

US 2021/0373325 A1    Dec. 2, 2021

(30) Foreign Application Priority Data

Jun. 2, 2020 (DE) .................. 102020206821.6

(51) Int. Cl.
*G02B 27/00* (2006.01)
*G02B 27/01* (2006.01)
(Continued)

(52) U.S. Cl.
CPC .......... *G02B 27/0093* (2013.01); *G01P 3/366* (2013.01); *G01S 17/58* (2013.01);
(Continued)

(58) Field of Classification Search
CPC . G01P 3/36; G01P 3/366; G01S 17/34; G01S 17/58; G01S 17/66; G01S 17/88;
(Continued)

(56) References Cited

U.S. PATENT DOCUMENTS

2016/0274365 A1   9/2016   Bailey et al.
2017/0131765 A1   5/2017   Perek et al.
(Continued)

FOREIGN PATENT DOCUMENTS

DE   102014206626 A1   10/2015
DE   102014210892 A1   12/2015
DE   102018214637 A1    3/2020

OTHER PUBLICATIONS

Search Report from corresponding DE Application No. 10 2020 206 821.6 dated Feb. 11, 2021, 7 pages.
(Continued)

*Primary Examiner* — Dmitriy Bolotin
(74) *Attorney, Agent, or Firm* — Tucker Ellis LLP (57) ABSTRACT

A method for detecting a gaze direction of an eye includes the steps of irradiating at least one wavelength-modulated laser beam onto an eye, detecting an optical path length of the emitted laser beam based on laser feedback interferometry of the emitted laser radiation with a backscattered radiation from the eye, detecting a Doppler shift of the emitted radiation and the backscattered radiation based on the laser feedback interferometry, detecting an eye velocity based on the Doppler shift, and detecting an eye movement of the eye based on the optical path length and the eye velocity.

13 Claims, 3 Drawing Sheets

(51) Int. Cl.
    *G01P 3/36*     (2006.01)
    *G01S 17/58*     (2006.01)
    *G02B 27/10*     (2006.01)

(52) U.S. Cl.
    CPC ..... *G02B 27/0172* (2013.01); *G02B 27/0179* (2013.01); *G02B 27/1006* (2013.01); *G02B 2027/0178* (2013.01); *G02B 2027/0187* (2013.01)

(58) Field of Classification Search
    CPC .......... G01S 7/4815; G02B 2027/0178; G02B 2027/0187; G02B 27/0093; G02B 27/0172; G02B 27/0179; G02B 27/1006
    See application file for complete search history.

(56) References Cited

U.S. PATENT DOCUMENTS

| | | | |
|---|---|---|---|
| 2017/0261610 A1* | 9/2017 | Scally | G01S 15/50 |
| 2019/0043392 A1 | 2/2019 | Abele | |
| 2019/0163266 A1* | 5/2019 | Johnson | G06F 3/014 |
| 2020/0026350 A1* | 1/2020 | Eash | H04N 7/183 |
| 2020/0285058 A1 | 9/2020 | Sangu et al. | |
| 2021/0271320 A1* | 9/2021 | Fiess | G02B 27/0172 |
| 2021/0373659 A1* | 12/2021 | Petersen | G02B 27/0093 |

OTHER PUBLICATIONS

Giuliani, Guido, et al., "Laser diode self-mixing technique for sensing applications", Journal of Optics A: Pure and Applied Optics, (2002), pp. S283-S294.

Pruijmboom, Armand, et al., "VCSEL-based miniature laser-Doppler interferometer", International Society for Optics and Photonics, (2008) vol. 6908, 69080I, 7 pages.

* cited by examiner

METHOD FOR DETECTING A GAZE DIRECTION OF AN EYE

RELATED APPLICATION DATA

This application claims priority to and benefit of German Application No. DE 10 2020 206 821.6 filed Jun. 2, 2020, the entirety of which is incorporated by reference.

PRIOR ART

The present invention relates to a method for detecting a gaze direction of an eye and a gaze direction detection arrangement as well as a pair of smart glasses.

The use of eye-tracking or eye detection (also known as oculography) to determine eye movements and to estimate a gaze direction is well known. Known systems for eye tracking are often based on detecting information on the eye position using camera-based systems, or using electrical or electromagnetic sensors in the region of the eye. In addition, scanned laser systems are known, which, for example, use micromirrors to scan a laser spot across the eye. All of these systems usually come with high complexity and energy consumption, mostly having limited temporal resolution.

DISCLOSURE OF THE INVENTION

Contrary to this, the method according to the invention having the features of claim 1 is characterized by a particularly energy-saving, cost-effective and temporally high-resolution approach to gaze detection. This is achieved by a method for detecting a gaze direction of an eye, comprising the steps:

- irradiating an eye using at least one wavelength-modulated laser beam,
- detecting an optical path length of the emitted laser beam based on laser feedback interferometry of the emitted laser beam and radiation backscattered from the eye,
- detecting a Doppler shift, in particular between frequencies, of the emitted and the backscattered radiation based on laser feedback interferometry,
- detecting an eye velocity based on the Doppler shift, and
- detecting a gaze movement of the eye based on the optical path length and/or the eye velocity.

In other words, in the method at least one wavelength-modulated laser beam, which is emitted in particular from a wavelength-modulated laser source, is irradiated onto an eye of a user. The irradiated laser beam is at least partially backscattered at an ocular surface of the eye. The backscattered radiation is that portion of the radiation scattered at the ocular surface which is parallel to the emitted laser beam, thus being able to interfere therewith. This backscattering portion interferes with the incident laser radiation, i.e. with the laser radiation propagating toward the eye. The backscattered portion of the irradiated laser beam may also be referred to as backscattered radiation. By means of the so-called laser feedback interferometry, overlap of the emitted laser beam with the backscattered radiation is created, such that interference radiation resulting therefrom exists. This resulting interference radiation can be detected and analyzed using a detector, for example.

Based on laser feedback interferometry, an optical path length of the emitted laser beam is detected. The optical path length is considered to be the product of a geometric distance covered by the emitted laser beam from the laser source to the surface of the eye and a refractive index of the material present there. This means that if the laser beam is emitted in air (refractive index of approx. 1) from a laser source directly towards the eye, the optical path length is a very good approximation of the distance between the laser source and the eye. For example, if the wavelength of the emitted laser radiation is known, the optical path length can be estimated based on constructive or destructive interference.

Preferably, triangle-modulated laser light is emitted as a laser beam within the wavelength. By analyzing the radiation which is interferingly emitted and backscattered, especially by calculating an average of the resulting interference frequencies with respect to the two edges of the triangle-modulated signal, the optical path length can be detected.

Furthermore, if there is a movement of the eye in relation to the interspersed laser radiation, a Doppler shift occurs due to the Doppler effect, especially between the frequencies of the emitted and the backscattered radiation. By means of laser feedback interferometry, this Doppler shift can be detected. The Doppler shift can then be used to determine the eye velocity. The eye velocity is considered to be a tangential velocity of a point on the ocular surface, this point corresponding to the point where the laser radiation impinges on the ocular surface. Preferably, the eye velocity comprises an absolute value for the current velocity, as well as a direction of the current velocity.

Based on the detected optical path length as well as the eye velocity, the eye movement can then be detected. In particular, starting from a known eye position, the gaze direction can be tracked according to any movements of the eye. The method thus allows precise determination of the eye's gaze movements in a particularly simple and efficient manner. The specific method of detecting the gaze direction using laser feedback interferometry, especially using the Doppler effect, offers the advantage of particularly high temporal sampling rate, so that the eye movements may be tracked with particularly high temporal resolution. In addition, the method offers the advantage of using simple and inexpensive components and evaluation algorithms, which have low energy requirements. Especially no computationally intensive image data processing is required. In addition, it is advantageous that moving components, such as scanning devices, will not be required, thus providing particularly flexible and robust applicabilities.

Preferred further embodiments of the invention are the subject matter of the subclaims.

Preferably, the method further comprises the steps of: detecting a reflectivity of the eye based on the amplitude and phase position of the radiation backscattered by the eye, and detecting an absolute eye position based on the detected reflectivity and the optical path length. In this context, reflectivity especially is the complex reflectivity having the amplitude and phase position of the radiation backscattered by the eye. By additionally measuring the reflectivity of the eye, the current position of the eye can be detected with particular precision, and thus the gaze direction can also be detected. Advantageously, based on different reflectivities of different parts of the eye, it can be recognized which portion of the eye is currently irradiated by the laser beam, wherefrom, in connection with the optical path length, the absolute eye position can be estimated. For example, the reflectivity significantly and characteristically differs when the laser radiation impinges on different portions of the eye. For example, compared to retina irradiation, significantly stronger scattering occurs when the laser radiation hits the iris of the eye, passing through the cornea. Preferably, reflectivity determination can therefore be used to determine when anatomical boundaries are moved past the laser beam, which laser beam is stationary especially with respect to a head of the user during a movement of the eye. In this way, it can be detected with particular ease and precision which absolute eye position and thus which gaze direction of the eye currently exists.

Preferably, the absolute eye position is detected based on the reflectivity and optical path length at predefined points of time. Any eye movement is detected between the predefined times based on the eye velocity. Preferably, integration of the detected eye velocity can be performed between the predefined points of time, so that an angle by which the eye was moved during eye movement can be estimated. In particular, the absolute eye position will not persistently be detected, but only at specified points of time. Between these points of time, the relative eye movement is estimated by the particularly energy-saving approach of detecting the eye velocity based on the Doppler shift. In this way, the eye position and the gaze direction can be detected in a particularly efficient manner.

Preferably, determination of the eye velocity is done based on the equation: $F_D = 2 \, v \, \cos(\alpha)/\lambda$, wherein $\lambda$ is the wavelength of the incident laser radiation, v is the eye velocity, $F_D$ is the Doppler shift of the emitted radiation and the backscattered radiation, and $\alpha$ is an angle between a wave vector k of the incident laser radiation and a tangent line which contacts the ocular surface at an impact point where the laser radiation impinges on the eye and which also is located in the plane spanned by the wave vector k and the surface normal at the impact point. Especially, the Doppler shift $F_D$ corresponds to an amount of the difference between the frequency of the emitted laser beam and the frequency of the backscattered radiation. Using the above equation, the eye velocity can be detected with particularly low computational effort to be able to determine the eye movement efficiently and with high resolution.

Particularly preferably, the method further comprises the steps of: detecting a rotation rate of the eye, and calibrating to determine the angle $\alpha$, wherein calibrating is done by using the optical path length, the eye velocity, and the rotation rate of the eye. By collection of the corresponding parameters, precise calibration of the gaze detection can thus be performed to optimally estimate the eye gaze direction at any point of time. Preferably, the step of calibrating comprises recording a gaze angle map, which includes measurement data of all parameters recorded for the calibration, or for a plurality of predetermined gaze angles of the eye, respectively. Using the gaze angle map, it is thus possible to determine which gaze angle of the eye currently exists, in a particularly simple and efficient manner, when performing the method for a specific set of parameters.

Preferably, the rotation rate of the eye is detected depending on a rotation rate of a head of the user, wherein the rotation rate of the head is detected especially using a rotation rate sensor. Preferably, the rotation rate sensor is part of an inertial measurement unit, which is preferably configured to detect any acceleration, and, for example, additionally a geomagnetic field, in addition to the rotation rate. An absolute orientation sensor is particularly advantageous, which is especially configured to detect a rotation rate about three axes, and preferably any acceleration, and further preferably a geomagnetic field. To detect the rotation rate of the head, the rotation rate sensor can be arranged, for example, on a head of the user. In particular, the rotation rate of the eye is detected based on the assumption that the eye performs a rotation exactly opposite to the rotation of the head when vision is focused onto a point defined in space. Thus, calibration can be performed in a particularly simple way.

Preferably, the method further comprises the steps of: detecting a maximum eye velocity during an eye movement, and predicting an eye movement end position based on the maximum velocity. Operation of the input unit and/or output unit is thereby performed based on the eye movement end position. Particularly preferably, adjustment of image parameters of the image projected by the image projection unit is performed based on the eye movement end position. In particular, it is thus possible to predict at which position the eye movement stops in the case of rapid eye movements, so-called saccades. Preferably, prediction of the eye movement end position is based on the assumption that the eye performs a uniformly accelerated movement during such an eye movement. That is, there is constant positive acceleration during a first half of such eye movement, whereas constant negative acceleration, especially of the same magnitude, occurs during the second half of the eye movement. By detecting the first half of a corresponding velocity curve, i.e. the velocity of the eye movement starting from standstill up to maximum velocity during the movement, the second half of the velocity curve may be estimated, especially based on the assumption of mirror symmetry. In this way, especially by integration of the detected velocity curve, the end point of the eye movement may be estimated. Preferably, determination of the maximum velocity during the eye movement is based on detecting a decreasing eye velocity following an increase of the eye velocity.

Preferably, at least two laser beams are irradiated onto the eye, the two laser beams being aligned such that an angle and/or a distance between a wave vector of each laser beam and, in each case, at least one of two mutually orthogonal rotational axes is not equal to zero. In order to detect a rotational movement of the eye about a rotational axis, it is advantageous for the wave vector of the laser beam to enclose a maximally large angle with the rotational axis and, at the same time, to be maximally spaced apart therefrom. For example, if the distance and/or the angle enclosed with the rotational axis is equal to zero, the laser beam is not sensitive to any rotational movement about this axis. In other words, in accordance with this relationship, it is advantageous for the two laser beams to be aligned such that they are each particularly sensitive to one of the rotation rates of the eye about two mutually orthogonal rotational axes. Preferably, in the particular case where both laser beams are incident onto the same point on the surface of the eye, the laser beams are aligned such that projections of the two laser beams onto a tangential plane at the eye and at the point of incidence are orthogonal to each other. That means, in this case, the portions of the two laser beams tangential to the ocular surface are aligned orthogonally to each other at the common point of incidence of the laser beams on the eye. Preferably, the tangential portions of the two laser beams are aligned vertically and horizontally, respectively. Thus, the eye movement in any direction can be detected with particular ease and accuracy.

Furthermore, the invention provides a gaze detection arrangement for detecting a gaze direction. The gaze detection arrangement comprises a laser device, which is configured to irradiate at least one laser beam onto an eye, and a control device, which is configured to actuate the laser device, the control device being configured to execute the method described. The eye detection arrangement is characterized by a particularly simple and inexpensive design, comprising high detection rate and low energy requirement.

Preferably, the laser device includes at least one surface emitter (also referred to as a vertical-cavity surface-emitting laser, or briefly VCSEL) having a photodiode integrated therein. With such a laser device, the eye movements can be detected with the laser feedback interferometry-based eye-tracking arrangement having particularly simple, compact and cost-effective design. Such a laser device is especially suitable for the detection using the self-mixing effect. Preferably, in this case the photodiode is used to detect the overlap of the emitted and backscattered radiation directly within the laser cavity. Particularly preferably, the laser device may comprise a plurality of surface emitters, each irradiating a laser beam.

Preferably, the laser device comprises a beam splitting element which is configured to split a single laser beam into at least two laser beams. This enables particularly simple and cost-effective configuration for the eye-tracking arrangement.

Particularly preferably, the at least one laser beam emitted by the laser device is directed directly onto the eye. Alternatively or additionally, the gaze detection arrangement may further comprise a deflection element which is configured to deflect at least one laser beam emitted by the laser device onto the eye. Preferably, the deflection element is a micromirror actuator, especially one that can be operated in a controllable manner. Alternatively preferably, the deflecting element is a holographic optical element.

Furthermore, the invention relates to smart glasses comprising the eye-tracking arrangement described above. Preferably, the laser device comprises at least one laser source arranged on a spectacle frame and/or on a spectacle temple. In this context, a frame is especially considered to be a region of the smart glasses surrounding a lens, whereas a temple is especially considered to be a holding temple connected to the frame and extending, for example, to an ear of the user. For example, several laser sources can distributedly be configured around the spectacle lens on the spectacle frame, thus allowing particularly precise scanning of the eye across its entire range of motion. Alternatively or additionally, one or more laser sources may be integrated, preferably molded, into the spectacle lens.

Particularly preferably, the smart glasses further comprise a rotation rate sensor, which is configured to detect any rotation of the users head. Preferably, the rotation rate sensor is part of an inertial measurement unit and/or an absolute orientation sensor. Thus, all the hardware required for gaze detection as well as for calibration of the gaze detection can be integrated into a single device, thereby enabling particularly high level of user convenience.

Preferably, the smart glasses further comprise an input and/or output device which is configured to receive an input from the user and/or to output an output to the user. Preferably, the input and/or output device comprises a projection device configured to project an image, especially onto a retina of the users eye. Preferably, the input and/or output device and the eye tracking arrangement are coupled to each other, especially via the control device of the eye tracking arrangement, such that especially the input and/or output device can be controlled depending on the eye movements of the eye. This enables particularly user-friendly operation of the smart glasses, the specific type of gaze detection providing high level of precision and simultaneously particularly low energy consumption as well as low costs.

BRIEF DESCRIPTION OF THE DRAWINGS

In the following, the invention will be described by means of example embodiments in connection with the figures. In the figures, functionally identical components are each indicated by the same reference numbers, wherein.

PREFERRED EMBODIMENTS OF THE INVENTION

Figure 1:
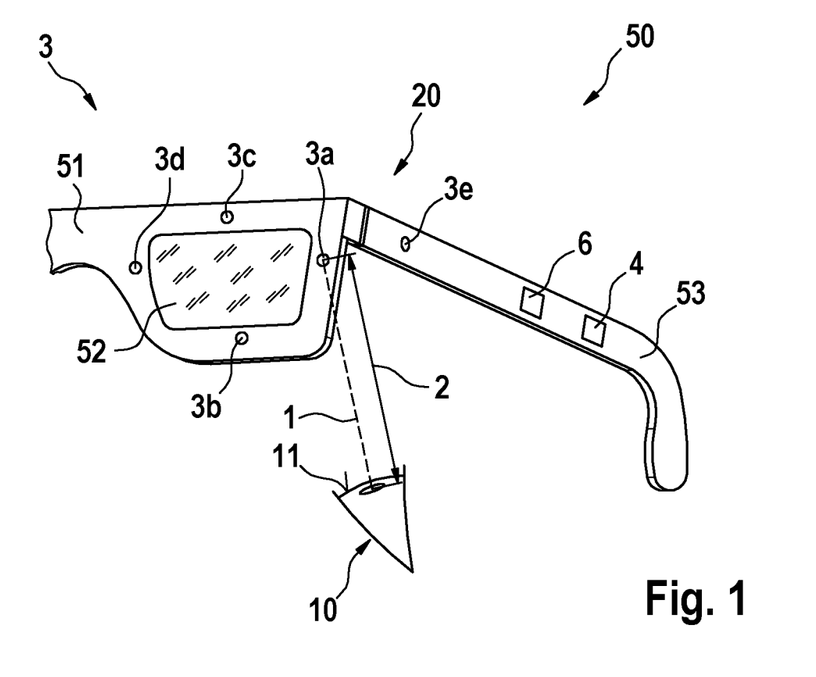
FIG. 1 is a simplified schematic view of a pair of smart glasses according to a first embodiment of the invention.

FIG. 1 shows a simplified schematic view of a pair of smart glasses 50 according to a first embodiment of the invention. The smart glasses 50 comprise a spectacle lens 52, a spectacle frame 51 in which the spectacle lens 52 is received, and a spectacle temple 53 for holding the smart glasses 50 on a users head. The smart glasses 50 are thus configured to be worn on a users head.

The smart glasses 50 comprise a gaze detection arrangement 20, by which a gaze direction of an eye 10 of the user may be detected. For this purpose, the gaze detection arrangement 20 comprises a laser device 3 and a control device 4, which is configured to operate the laser device 4 to perform a respective method for detecting the gaze direction of the eye 10. The control device 4 is arranged in the spectacle temple 53 of the smart glasses 50 for compact design.

The laser device 3 includes a total of five surface emitters 3a, 3b, 3c, 3d, 3e as laser sources. Four of the five surface emitters 3a, 3b, 3c, 3d are distributedly arranged on the spectacle frame 51 around the spectacle lens 52. A fifth surface emitter 3e is arranged on the spectacle temple 53. Each of the surface emitters 3a, 3b, 3c, 3d, 3e is configured to irradiate a wavelength-modulated laser beam 1 onto the eye 10. In this case, triangle-modulated laser light is emitted as the laser beam 1 within the wavelength. For the reason of clarity, only one single laser beam 1 emitted by the first surface emitter 3a is shown in the figures. Each laser beam 1 is directed in a separate laser spot 30a, 30b, 30c, 30d, 30e onto an ocular surface 11 of the eye 10.

Figure 2:
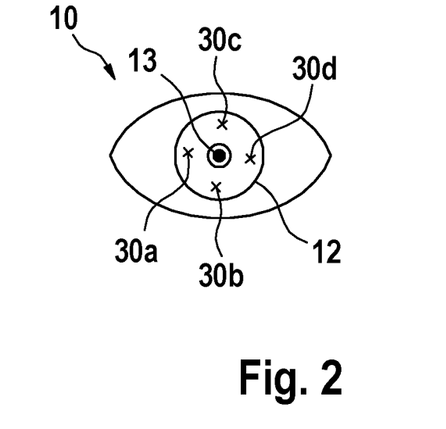
FIG. 2 is a simplified schematic detailed view of a gaze detection procedure using the smart glasses of FIG. 1.
Figure 3:
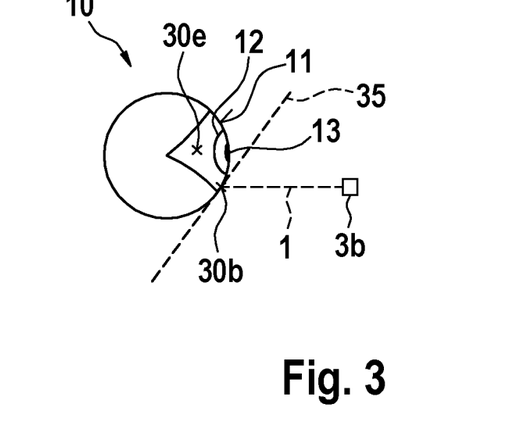
FIG. 3 is another simplified schematic detailed view of the implementation of gaze detection using the smart glasses of FIG. 1.

FIG. 2 shows the laser spots 30a, 30b, 30c, 30d of the first four surface emitters 3a, 3b, 3c, 3d arranged on the spectacle frame 51. In FIG. 3, the fifth laser spot 30e generated by the fifth surface emitter 3e is shown on the side of the eye 10.

As can be seen in FIGS. 2 and 3, the laser spots 30a, 30b, 30c, 30d, 30e are preferably located within a region of the iris 12 of the eye 10, or in the vicinity of that region. As a result, when the eye 10 is moved, the pupil 13 of the eye 10 is often moved close to or through the laser spots 1, so that the position and movement of the pupil 13 may be detected with high accuracy to determine the gaze direction of the eye with high accuracy.

Realization of the method for detecting the gaze direction of the eye 10 is described in detail below, the description being based on a single laser beam 1 only.

The laser beam 1 is initially irradiated onto the eye 10. At the eye surface 11, the laser beam 1 will at least partially be backscattered. As a result, overlap of the irradiated laser beam 1 with the portion of the backscattered radiation propagating back in parallel in the direction of the surface emitter 3a occurs. By means of the photodiode integrated in the surface emitter 3a, a laser feedback interferometry is performed to detect the resulting interference radiation, as an overlap of irradiated laser radiation 1 and radiation backscattered in the opposite direction. As the photodiode is integrated directly into the laser cavity of the surface emitter 3a, detection of the resulting interference radiation is performed by the so-called self-mixing effect.

Figure 4:
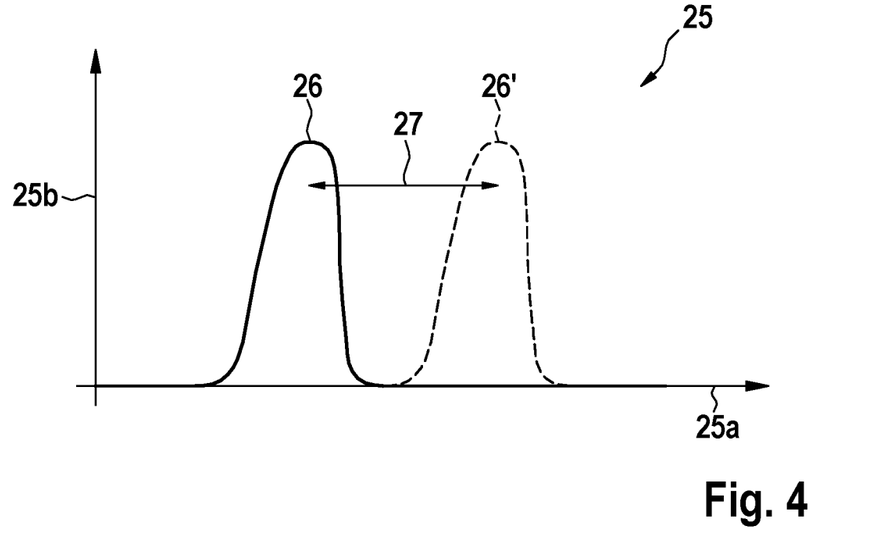
FIG. 4 is a simplified schematic representation of measurement data from the smart glasses of FIG. 1 when performing gaze detection.

An exemplary frequency spectrum 25 of the resulting interference radiation, which can be detected by means of the integrated photodiode of the surface emitter 3a, is shown schematically in FIG. 4. The axis 25a corresponds to the frequency and the axis 25b to the amplitude. The reference number 26 indicates the peak frequency of the detected interference radiation, detected for example by means of a Fourier analysis. As a result of the triangular modulation of the wavelength of the emitted laser beam 1, the peak frequency 26 is dependent on an optical path length 2. The optical path length 2 (cf. FIG. 1), corresponds to a distance covered by the laser beam 1 between the surface emitter 3a and the ocular surface 11. As the laser beam 1 is irradiated directly onto the eye 10, in the first embodiment of FIG. 1, the optical path length 2 corresponds to the shortest distance between the surface emitter 3a and the eye surface 11. Thus, with a wavelength of the emitted laser beam 1 being known, the optical path length 2 may be detected based on laser feedback interferometry for a specific eye position, i.e. for a specific gaze direction.

FIG. 4 shows an exemplary frequency spectrum 25, which is being recorded during constant movement of the eye surface 11 in relation to the laser beam 1, i.e. during rotation of the eye 10. During that movement, a shift 27 of the peak frequency 26 occurs towards a shifted peak frequency 26' shown as a dashed line, as a result of the Doppler effect. The Doppler shift of the emitted and the backscattered laser radiation resulting therefrom can thus be detected based on the frequency spectrum 25. Based on this Doppler shift, the instantaneous eye velocity of a movement of the eye 10 as well as a direction of the movement can be detected.

To calculate the eye velocity using the Doppler shift, an angle α between the eye surface 11 and the laser beam 1 is detected and taken to compensate for any oblique position of the irradiated laser radiation 1 in relation to the eye surface 11. In detail, the angle α describes the smallest angle between the laser beam 1 and a plane 35 configured at the corresponding laser spot 30b tangential to the ocular surface 11 (cf. FIG. 3).

Calibration can be performed depending on a rotation rate of the eye 10 to determine the angle α. The rotation rate of the eye 10 is detected depending on a rotation rate of the users head, wherein the rotation rate of the head during rotating is detected using a rotation rate sensor 6, which is integrated in the spectacle temple 53, while simultaneously a stationary point in space is focused with the eye 10. The rotation rate of the eye 10 is estimated under the assumption that the eye performs a movement opposite to the head movement.

In addition to detecting the frequencies of the irradiated and backscattered laser radiation, a signal-to-noise ratio of the backscattered radiation is detected, wherefrom a reflectivity of the eye 10 is detected. The reflectivity is different for different region of the eye 10. Particularly, the reflectivity which has been detected changes when the laser beam 1 passes anatomical boundaries of the eye 10, such as the iris 12 or the pupil 13. Thus, the reflectivity of the eye 10 can be used to estimate which region of the eye 10 is currently irradiated by the laser beam 1. An instantaneous absolute eye position of the eye 10 can thus be detected in combination with the detected optical path length 2.

Thus, any eye movement can be detected using the eye tracking arrangement 20 based on the laser feedback interferometry, wherein any eye movement of the eye 10 can be detected and tracked. In combination with the determination of the absolute eye position, which, for example, will only be executed at predetermined times, and additionally based on the reflectivity, the instantaneous gaze direction of the eye 10 can thereby be detected. Using the components required to perform determination of the gaze direction, particularly high temporal resolution of gaze direction determination can be achieved with low energy requirements. In addition, particularly low-cost components can be used.

Figure 5:
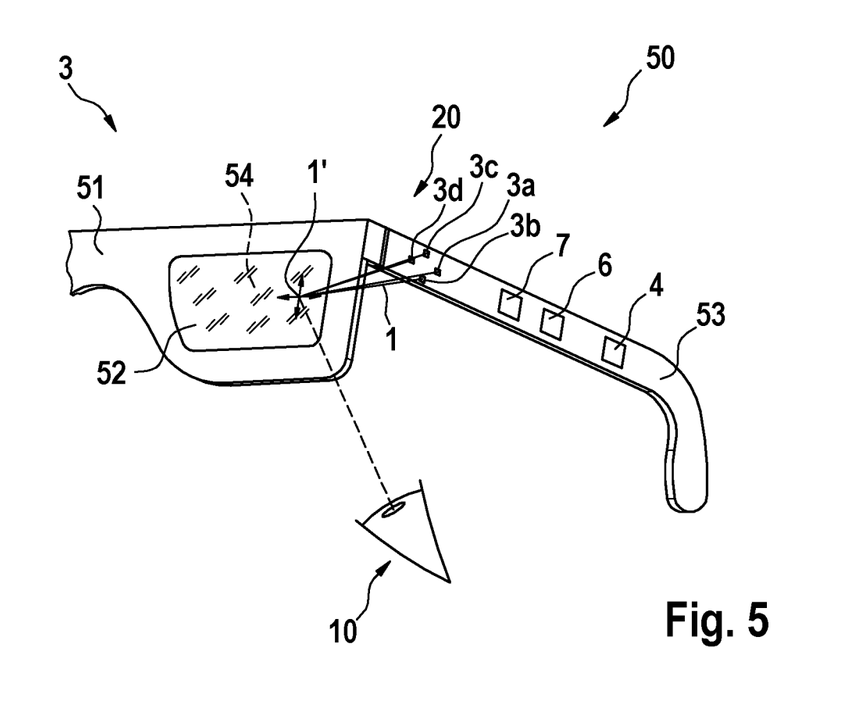
FIG. 5 is another simplified schematic view of a pair of smart glasses according to a second embodiment of the invention.

FIG. 5 shows a simplified schematic view of a pair of smart glasses 50 according to a second embodiment of the invention. The second embodiment essentially corresponds to the first embodiment of FIG. 1 but with the difference of the laser device 3 being alternatively configured. In the second embodiment of FIG. 5, the laser device 3 of the eye tracking arrangement 20 comprises four surface emitters 3a, 3b, 3c, 3d with integrated photodiode, all of which are arranged on the spectacle temple 53. The laser beams 1 emitted by the surface emitters 3a, 3b, 3c, 3d will thus be indirectly irradiated onto the eye 10. Specifically, the laser beams 1 are irradiated onto the spectacle lens 52, exemplified by a focusing point 1' on the spectacle lens 52. A deflection element 54 in the form of a holographic optical element is integrated into the spectacle lens 52, which deflects the laser beams 1 towards the eye 10. In this way, an alternative arrangement of the laser device 3 may be provided, by which the method for detecting the gaze may also be performed.

Furthermore, the smart glasses 50 of the second embodiment of FIG. 5 additionally comprise an input and/or output device 7 which is configured to output an output to the user. The input and/or output device 7 comprises a projection unit, which is configured to project an image onto a retina of the eye 10. The projection unit can be used, for example, to display an augmented reality or virtual reality. Preferably, the projection unit is coupled to the control device 4, wherein the control device 4 is configured to operate the projection unit in response to the detected gaze direction. For example, the projected image can be adapted depending on the gaze direction.

Figure 6:
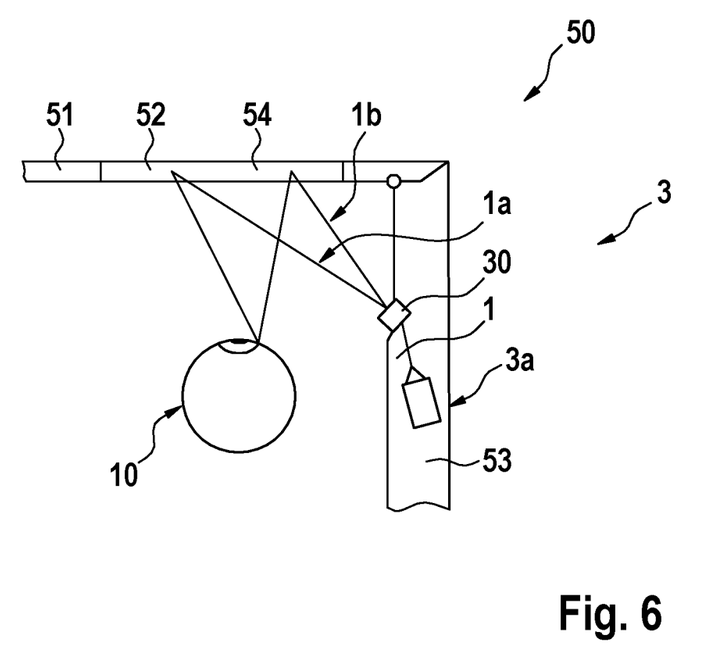
FIG. 6 is a simplified schematic view of a pair of smart glasses according to a third embodiment of the invention.

FIG. 6 shows a simplified schematic view of a pair of smart glasses 50 according to a third embodiment example of the invention. The third embodiment example essentially corresponds to the second embodiment example of FIG. 5 but having an alternative embodiment of the laser device 3.

In the third embodiment example, the laser device 3 only comprises a single surface emitter 3a as a laser source. The single laser beam 1 emitted from the single surface emitter 3a is split into two or more laser beams 1a, 1 b using a beam splitting element 30. The two laser beams 1a, 1 b will indirectly be irradiated onto the eye 10 via a deflection element 54 in the spectacle lens 52, similar to the second embodiment example of FIG. 5. For example, the two laser beams 1a, 1b can be focused on a common point on the eye 10, as shown in FIG. 6. By splitting the beams according to the third embodiment example, another particularly advantageous configuration and arrangement of the smart glasses 50 can be provided.

The invention claimed is:

1. A method for detecting a gaze direction of an eye, comprising the steps of:
   irradiating at least one wavelength-modulated laser beam onto an eye,
   detecting an optical path length of the irradiated laser beam based on laser feedback interferometry of the irradiated laser beam and the portion of the beam backscattered from the eye,
   detecting a Doppler shift of the irradiated laser beam and the backscattered portion based on laser feedback interferometry,
   detecting an eye velocity based on the Doppler shift,
   detecting an eye movement of the eye based on the optical path length and the eye velocity,
   detecting a reflectivity of the eye depending on the amplitude and phase position of the portion of the laser beam backscattered from the eye, and
   detecting an absolute eye position based on the reflectivity and the optical path length, wherein the absolute eye position detection is performed at predefined points of time, and wherein an eye movement between the predefined points of time is detected based on the eye velocity.

2. The method according to claim 1, wherein eye velocity detection is based on the following equation:

$$F_D = 2v \cos(\alpha)/\lambda, \text{ wherein:}$$

v is the eye velocity;
   $F_D$ is a Doppler frequency corresponding to the Doppler shift of the irradiated laser beam and the backscattered part of the emitted laser beam,
   $\alpha$ is an angle between a direction of the irradiated laser beam and a tangent to an ocular surface which contacts the ocular surface at an impingement point at which the laser beam impinges on the eye and which also is located in the plane spanned by a wave vector and a surface normal at the impingement point; and
   $\lambda$ is a wavelength of the irradiated laser beam.

3. The method according to claim 2, further comprising the steps of:
   detecting a rotation rate of the eye; and
   calibrating to determine the angle $\alpha$,
   wherein the calibration is based on the optical path length, the eye velocity, and the rotation rate of the eye.

4. The method according to claim 3, wherein the rotation rate of the eye is detected depending on a rotation rate of a head of the user detected by means of a rotation rate sensor.

5. The method according to claim 1, further comprising the steps of:
   detecting a maximum eye velocity during an eye movement, and
   predicting an eye movement end position based on the maximum velocity.

6. The method according to claim 5, wherein at least two laser beams are irradiated onto the eye, and wherein the two irradiated laser beams are aligned such that an angle and/or a distance between a wave vector of each irradiated laser beam and at least one of two mutually orthogonal rotational axes of the eye, respectively, is not zero.

7. A gaze detection arrangement for detecting a gaze direction, comprising:
   a laser device which is configured to irradiate at least one laser beam onto an eye, and
   a control device which is configured to operate the laser device and:
     irradiate the at least one laser beam onto an eye,
     detect an optical path length of the irradiated laser beam based on laser feedback interferometry of the irradiated laser beam and the portion of the beam backscattered from the eye,
     detect a Doppler shift of the irradiated laser beam and the backscattered portion based on laser feedback interferometry,
     detect an eye velocity based on the Doppler shift,
     detect an eye movement of the eye based on the optical path length and the eye velocity,
     detect a reflectivity of the eye depending on the amplitude and phase position of the portion of the laser beam backscattered from the eye, and
     detect an absolute eye position based on the reflectivity and the optical path length, wherein the absolute eye position detection is performed at predefined points of time, and wherein an eye movement between the predefined points of time is detected based on the eye velocity.

8. The gaze detection arrangement according to claim 7, wherein the laser device comprises at least one surface emitter with integrated photodiode.

9. The gaze detection arrangement according to claim 7, wherein the laser device comprises a beam splitting element which is configured to split a single laser beam into at least two laser beams.

10. The gaze detection arrangement according to claim 7, wherein the at least one laser beam is directed directly onto the eye, and/or wherein the gaze detection arrangement further comprises a deflection element which is configured to deflect the at least one laser beam irradiated by the laser device onto the eye.

11. A pair of smart glasses comprising a gaze detection arrangement comprising:
    a laser device which is configured to irradiate at least one laser beam onto an eye, and
    a control device which is configured to operate the laser device and:
      irradiate the at least one laser beam onto an eye,
      detect an optical path length of the irradiated laser beam based on laser feedback interferometry of the irradiated laser beam and the portion of the beam backscattered from the eye,
      detect a Doppler shift of the irradiated laser beam and the backscattered portion based on laser feedback interferometry,
      detect an eye velocity based on the Doppler shift,
      detect an eye movement of the eye based on the optical path length and the eye velocity,
      detect a reflectivity of the eye depending on the amplitude and phase position of the portion of the laser beam backscattered from the eye, and
      detect an absolute eye position based on the reflectivity and the optical path length, wherein the absolute eye position detection is performed at predefined points of time, and wherein an eye movement between the predefined points of time is detected based on the eye velocity,
    wherein the laser device comprises at least one laser source which is arranged on a spectacle frame, which especially surrounds a spectacle lens, and/or on a spectacle temple and/or is arranged in a spectacle lens.

12. The pair of smart glasses according to claim 11, further comprising a rotation rate sensor, which is configured to detect a rotation of the user's head.

13. The pair of smart glasses according to claim 11, further comprising an input and/or output device which is configured to receive an input from the user and/or to output an output to the user.

* * * * *